United States Patent [19]

Gillies

[11] Patent Number: 4,821,333

[45] Date of Patent: Apr. 11, 1989

[54] MACHINE LEARNING PROCEDURES FOR GENERATING IMAGE DOMAIN FEATURE DETECTOR STRUCTURING ELEMENTS

[75] Inventor: Andrew M. Gillies, Ann Arbor, Mich.

[73] Assignee: Environmental Research Inst. of Michigan, Ann Arbor, Mich.

[21] Appl. No.: 899,518

[22] Filed: Aug. 22, 1986

[51] Int. Cl.$^4$ .............................................. G06K 9/54
[52] U.S. Cl. ....................................... 382/49; 382/41; 382/48; 382/55
[58] Field of Search .................... 364/513, 518; 382/1, 382/9, 10, 14–16, 27, 28, 36, 37, 39, 41, 48, 49, 55

[56] References Cited

U.S. PATENT DOCUMENTS

| | | | |
|---|---|---|---|
| 4,167,728 | 9/1979 | Sternberg | 382/49 |
| 4,177,448 | 12/1979 | Brayton | 382/39 |
| 4,286,330 | 8/1981 | Isaacson | 382/10 |
| 4,593,367 | 6/1986 | Slack et al. | 364/513 |
| 4,606,069 | 8/1986 | Johnsen | 382/39 |
| 4,644,585 | 2/1987 | Crimmins et al. | 382/41 |
| 4,651,289 | 3/1987 | Maeda et al. | 382/15 |
| 4,658,429 | 4/1987 | Orita et al. | 382/36 |
| 4,665,554 | 5/1987 | Sternberg | 382/27 |
| 4,670,848 | 6/1987 | Schramm | 382/15 |
| 4,682,365 | 7/1987 | Orita et al. | 382/14 |

OTHER PUBLICATIONS

Serra, J., *Image Analysis & Mathematical Morphology*, Academic Press, 1982, pp. 34–62.
Goldberg, D. E., "Optimal Initial Population Size for Binary-Coded Genetic Algorithms", Clearing House for Genetic Algorithms, U. of Alabama, 11/85, pp. 1–14.
Holland John, *Adaptation in Natural and Artificial Systems*, U. of Michigan Press, Ann Arbor, Mich., 1975.

*Primary Examiner*—Leo H. Boudreau
*Assistant Examiner*—Jose L. Couso
*Attorney, Agent, or Firm*—Krass & Young

[57] ABSTRACT

A method for generating a program to be used in two-class or multi-class image domain feature discrimination problems. A feature discrimination problem is solved by a serial neighborhood processor which is programmed to perform a series of mathematical morphological transformations as specified by structuring elements and morphological operations. The morphological operations are expressed in a program form typically developed by an experienced human, while the sequence of structuring elements used with the program form are generated by an algorithm which iteratively tests and scores the performance of various sequences of transformations, each sequence of transformations being representable by a binary sequence which is allowed to evolve by the processes of mutation and cross-linking. Acceptable forms of binary digit sequences are also disclosed.

41 Claims, 9 Drawing Sheets

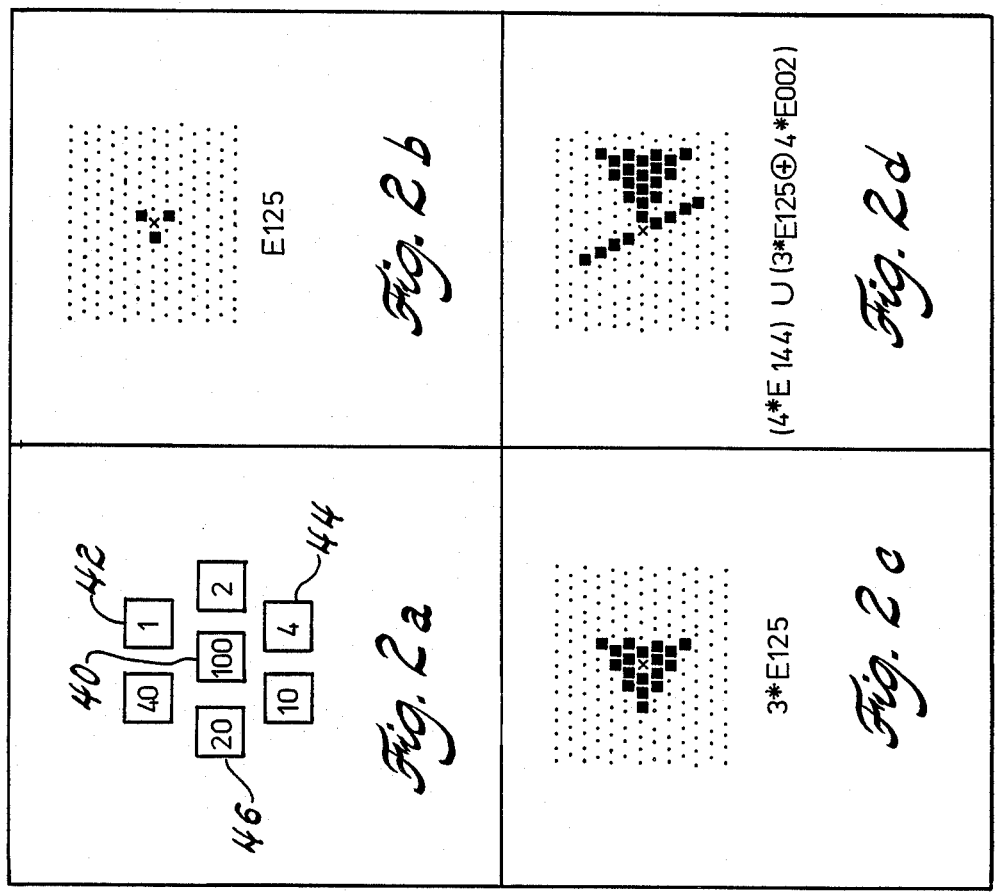

STRUCTURING
ELEMENTS:

FEATURE DETECTOR PROGRAM FORM: $(I \odot S1) \cap ((\sim I \odot S2) \oplus S3)$ $S1 = 3*E122$ $S2 = 4*E150 \oplus 3*E121$ $S3 = 6*E110$

IMAGE SAMPLE FROM ZEND SCRIPT

IMAGE SAMPLE FROM ARAMAIC SCRIPT

RESULT OF STEP 1 ON ARAMAIC SAMPLE

RESULT OF STEP 1 ON ZEND SAMPLE

STEP 1: $(I \odot S1)$

RESULT OF STEP 2 ON ARAMIC SAMPLE

RESULT OF STEP 2 ON ZEND SAMPLE

STEP 2: $(\sim I \odot S2)$

RESULT OF STEP 3 ON ARAMAIC SAMPLE

STEP 3: ((~I ⊙ S2) ⊕ S3)

RESULT OF STEP 3 ON ZEND SAMPLE

RESULT OF STEP 4 ON ARAMAIC SAMPLE

STEP 4: (I ⊙ S1) ∩ ((~I ⊙ S2) ⊕ S3)

RESULT OF STEP 4 ON ZEND SAMPLE

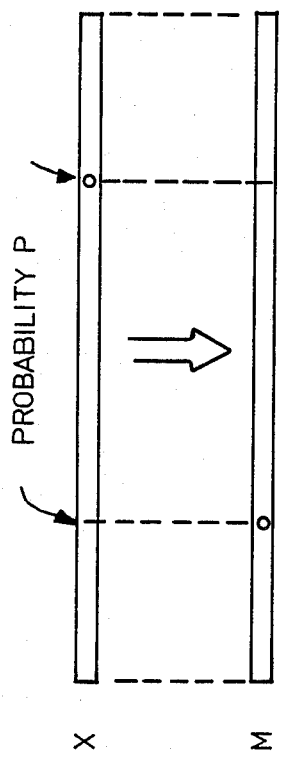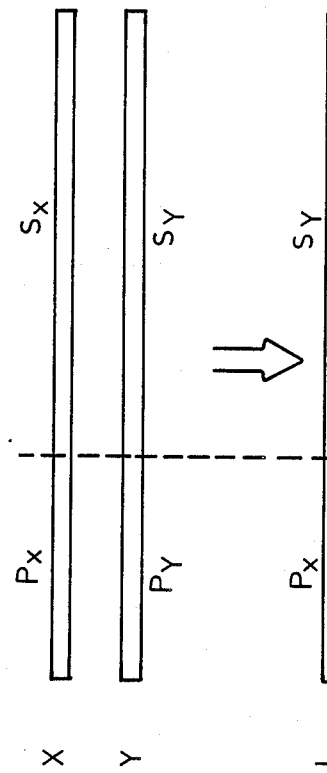

$S = E1(f_1) \oplus E1(f_2) \oplus \cdots \oplus E1(f_{10})$ $S = R2(f_3) * E2(f_1) \oplus R2(f_4) \, E2(f_2)$ $S = R2(f_1) * E3(f_2) \oplus R2(f_3) * E4(f_2)$

MACHINE LEARNING PROCEDURES FOR GENERATING IMAGE DOMAIN FEATURE DETECTOR STRUCTURING ELEMENTS

FIELD OF THE INVENTION

This invention relates to programs for use in an image processing computer for detecting features in images and, more particularly, to a method of generating a set of structuring elements to detect features in images through a series of neighborhood morphological transformations.

BACKGROUND OF THE INVENTION

Workers in the field of computer vision have long been interested in detecting features in images for purposes of image classification.

Among the many applications of image classification is character recognition. Character recognition can be posed as an image classification problem in which an image of the character to be classified is processed to determine, in accordance with a predetermined criterion, which character it represents.

Another application of image classification is feature detection and discrimination, in which an input image is analyzed to determine whether a predetermined feature is present. If the feature is found in the image, it can be used to discriminate that image from others not containing the feature.

Image classification schemes are typically developed through a trial and error procedure involving testing the schemes on a selected collection of training images to predict their performance when used on input images which have not been preselected. This trial and error procedure is iterative, and can involve a human being who uses the results achieved by the most recently proposed classification scheme to propose another classification scheme. The iterative procedure terminates when the person developing the scheme is satisfied with the performance achieved.

An especially useful computer organization for the purposes of image analysis is the serial neighborhood processor. One form of the serial neighborhood processor is the one disclosed in U.S. Pat. No. 4,167,728 to Sternberg, which modifies an input image in a series of steps. At every step of the series, each pixel can be modified according to the state of the corresponding pixel and its neighboring pixels in the preceding image. The changes imposed at each step in the series can be described in terms of morphological transformations such as erosion and dilation, and spatial constants called structuring elements. The structuring elements are used to describe which neighboring image points contribute to the resultant image.

The development of a pattern classification scheme involving neighborhood processing steps, therefore, involves, at each stage, a choice of the morphological transformation to be used and the structuring element to be used with it. Experience has shown that, while humans are adept at choosing the morphological transformation to be used, the process of choosing the structuring element to be used with the transformation is tedious and non-intuitive. Computers are especially useful in choosing the structuring elements.

It is therefore desirable to have a method for generating the structuring elements to be used by a serial neighborhood processor to perform a pattern classification task. These programs include a preselected series of morphological transformations and the generated structuring elements used by these morphological transformations.

SUMMARY OF THE INVENTION

In the present invention a method has been developed for generating a set of structuring elements for use in an image processing program operative to perform feature detection via a sequence of neighborhood transformations on a digital image comprising a matrix of points. Each feature detector is definable in terms of a set of image structuring elements and a series of morphological operations applying these structuring elements to an input image wherein the program produces a resulting image containing information relating to whether the input image belongs to a predetermined class.

According to one aspect of the invention, the method comprises the steps of performing a plurality of feature detections on a training set of images, some of the images known to belong to the predetermined class and the remainder of the training images known not to belong to the class. Each feature detector employs the same series of morphological operations but a different set of structuring elements. When applied to each image in the training set of images, each feature detector produces a resulting image containing information regarding a determination of whether that input image belongs to the predetermined class. Every one of the resulting images is evaluated in order to establish a measure of the success of the corresponding sets of structuring elements in correctly determining whether the members of the training set of images belong to the predetermined class. Next, a new set of structuring elements is produced. A successor subset is selected, the probability of selection of any particular structuring element being a function of the success of the measure of success of the structuring element in the preceding evaluation. This selected subset is then augmented by mutations and/or cross links. The steps above are performed using the most recently produced set of structuring elements, until the measure of success established by evaluating each of the resulting images meets a predetermined criterion.

In a further embodiment, a multiclass discrimination problem can be solved by defining classes according to whether they contain particular features and measuring the success of pluralities of feature detectors in correctly determining whether each image in a set of input images contains the particular feature. Succeeding pluralities of feature detectors are produced from the preceding pluralities of feature detectors according to a probability distribution that is a function of a weighted average of the successes of the preceding pluralities of feature detectors.

The probability distribution can control the probability that preceding feature detectors will belong to the succeeding feature detectors that preceding feature detectors will be mutated to produce succceding feature detectors and that preceding feature detectors will be crosslinked to produce succeeding feature detectors.

BRIEF DESCRIPTION OF THE DRAWINGS

FIGS. 2A-D illustrate a notation useful in designating structuring elements in connection with the invention;

FIGS. 6A-B are a schematic drawing of the mutation and cross-linking methods of generating new chromosomes;

DETAILED DESCRIPTION OF THE PREFERRED EMBODIMENTS

Figure 1:
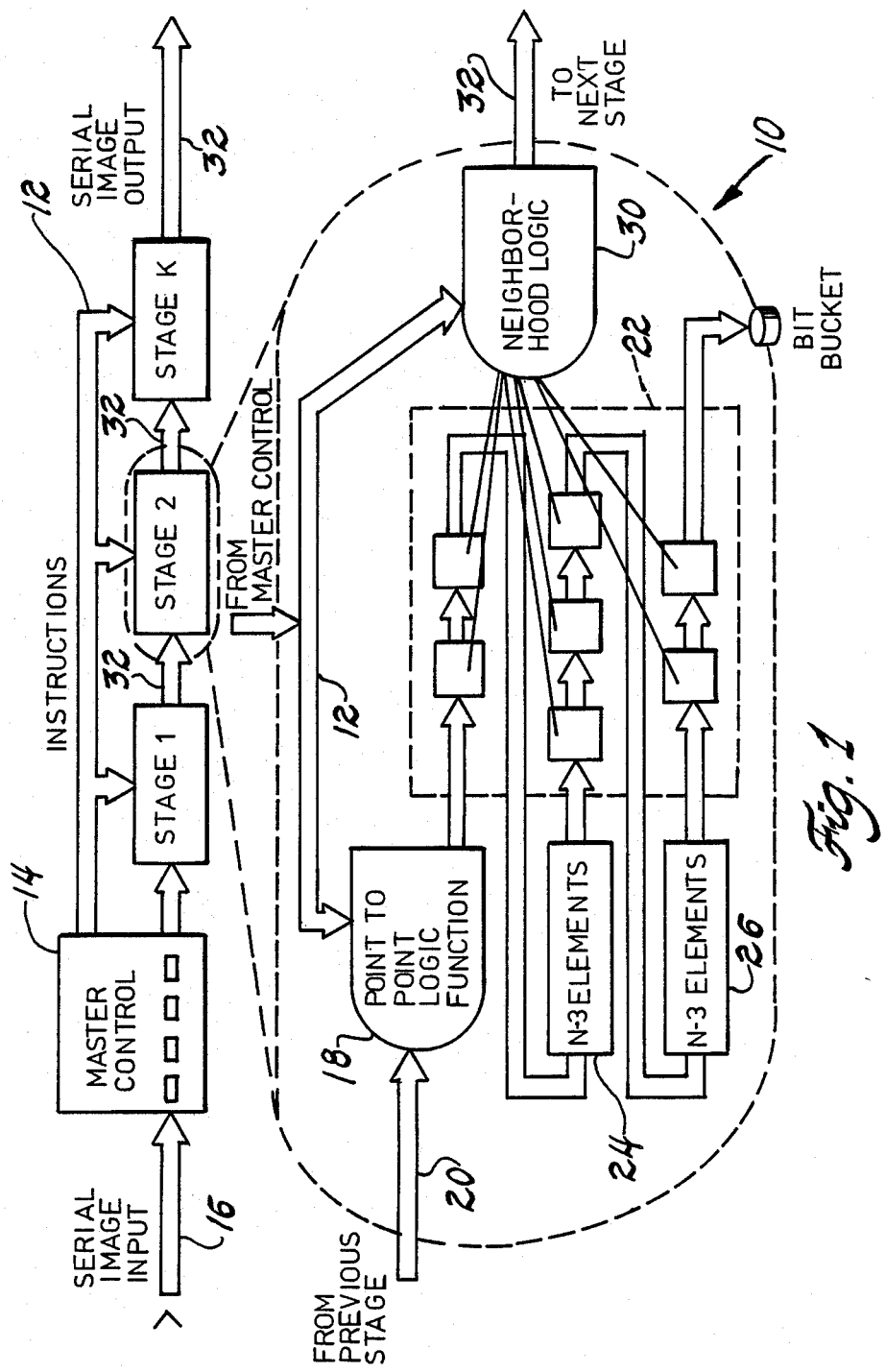
FIG. 1 is a schematic diagram of one form of computer useful with the programs developed by the method of the invention.

With reference to FIG. 1, in which is shown a neighborhood processing computer of the type known in the prior art as disclosed by Sternberg in U.S. Pat. No. 4,167,728, the data from an image comprising a sequence of picture elements (pixels) is processed in a series of stages, such as stage 10. Each stage in FIG. 1 is arranged to process pixels arrayed in a hexagonal pattern, having staggered rows of pixels, so that each pixel is surrounded by six equidistant pixels. The stages receive instructions over bus 12 from master control unit 14. Serialized image data are received by master control 14 over input bus 16. Each stage 10 employs a point-to-point logic function unit 18 which receives data from the previous stage over bus 20 and control signals from master control 14 and produces a string of pixel values. The string of pixel values is fed into a sequence of shift registers comprising shift register group 22 and serial strings of shift registers 24 and 26. As may be seen in FIG. 1, the shift register stages in group 22 contain pixels which are spacial neighbors in the original image.

While here and henceforth in this description it is assumed that the image is made from a two-dimensional array of hexagonally placed pixels, it will be apparent that any other convenient display of pixels, such as a rectangular display, may be used.

Neighborhood logic 30 receives the values contained within the shift registers of group 22. In accordance with instructions sent by master control 14 to point-to-point logic function 18 and neighborhood logic 30, neighborhood logic 30 produces a string of transformed pixels, one for each input pixel, on output bus 32. For example, neighborhood logic 30 can logically AND all of the variables in shift register group 22, with an output pixel having a value 1 only if a given input pixel and its six neighbors are all 1s. A number of other transformations are also possible, involving, for example, only a subset of the pixels neighboring the given input pixels.

The data on output bus 32 are treated as input data for the next stage 10 in sequence 12 or serve as the output image, in serial form, resulting from the transformations performed by the neighborhood processing computer.

It will be apparent to those skilled in the art that a wide variety of image transformation functions can be performed by a neighborhood processing computer of the type shown in FIG. 1. Other computers can be programmed to perform these image processing steps, although perhaps less efficiently than the neighborhood processor of FIG. 1.

It is well-known to those skilled in the art that image processing can be accomplished through the techniques of mathematical morphology, as described by Serra in "Image Analysis and Mathematical Morphology," Academic Press, 1982. Mathematical morphology transforms images through the pixel-wise logic operations of union and intersection and serial erosion and dilation steps.

The erosion and dilation steps require the designation of structuring elements (SEs) to determine which pixels are to be used to affect the resulting value at a given pixel location. SEs are patterns of pixel locations, defined with respect to a reference pixel location. Erosion can be thought of as a containment testing operator, indicating what pixels in an image can completely contain a translation of the structuring element. The erosion of an image by a structuring element contains only those points which, when the origin of the structuring element is translated to that point, the translated structuring element is completely contained in the original image. Erosion generally causes the number of pixels having the value of 1 to decrease. Thus, erosion generally causes the area of an image designated by a collection of ls to decrease in size, the effects produced being determined by the SE used. Erosion can be used to translate an image if the SE is a single pixel location displaced from the reference location. The dilation operator is so named because it tends to cause images to expand. The dilation is performed by translating the origin of a structuring element to every point in the image and including all points covered by any of the translations.

Erosion or dilation by a particular SE can be decomposed to a sequence of erosions and/or dilations involving only "elemental" SEs, which are defined in terms of only the six immediate neighboring locations of the reference location. As a result of this decomposition, the serial neighborhood processor of FIG. 1 is particularly well-suited for morphological transformation image analysis. Examples of decompositions are given in the next section of this detailed description.

Structuring Elements

For reasons to become apparent in the following, it is convenient to develop a notation for specifying elemental SEs, i.e., those which include only the immediate neighbors of a reference pixel location. For a hexagonal image array, the coding scheme of FIG. 2A will be useful. The numerical designation of an elemental SE will be determined by adding the numerical values corresponding to each of the pixel locations that are part of the SE. The numerical values are shown in FIG. 2A. Note that because the numerical values labeling the pixel locations are not all powers of 2, there will not be an SE corresponding to every possible numerical value. To illustrate the numerical designation of an SE, the structuring element E125 can easily be seen to be comprised of a central element 40 in FIG. 2A, along with immediate neighboring elements 42, 44, and 46. The value for this SE is then determined by adding the numerical values corresponding to pixel locations 40-46. This value is $100+1+4+20=125$.

One method for creating SEs is to repeatedly dilate a SE by itself. An example of this procedure is shown in FIG. 2C, where the SE E125, as shown in FIG. 2B first dilates another copy of E125 to produce 2*E125 and then dilates 2*E125 to produce 3*E125. FIG. 2D shows another SE composed by combining the SEs 4*E144 and 3*E125 ⊕4*E002 by the logical union operator. With reference to FIG. 2A, it is clear that 4*E144 is a diagonal line, 9 pixels long, stretching from upper left to lower right. With reference to FIG. 2A, the structuring element 4*E002 can also be seen to be the single pixel 4 pixels to the right of the central pixel and, consequently, 3*E125⊕4*E002 is simply a copy of 3*E125 (shown in FIG. 2C) which has been translated 4 positions to the right of its location shown in FIG. 2C, as designated by the dilation operator⊕. FIG. 2D is quite clearly the union of these two structuring elements.

Program Forms

Figure 3A:
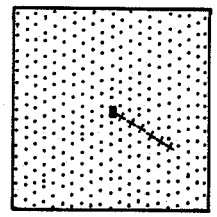
FIGS. 3A-C show structuring elements and a program form used in connection with an example of the use of the method.

FIG. 3 of the drawings illustrates a program form, designating the morphological transformations to be performed on an image I by a set of three structuring elements, S1, S2, and S3. The transformations are defined in terms of logic operators (union, ∪, and intersection, ∩) and erosion and dilation (⊖ and ⊕, respectively). FIG. 3 also shows the three structuring elements. This program form and the given SEs are useful to discriminate between samples taken from two distinct script styles, the Aramaic and the Zend scripts. While, through experience, a human can develop a program form appropriate to detect features found in one script type which are not present in the other script type, the human will generally experience difficulty in determining the set of structuring elements to be used with this program form.

It is a primary aspect of this invention to generate the structuring elcments used with a given program form to create a program for accomplishing a given feature detection task.

Feature Detector Generation

The set of structuring elements used in a feature detector are generated through an evolutionary process performed upon training images which are known to belong or known not to belong to the classes to be discriminated. In the manner to be described below, this evolutionary process involves testing the performance of a first generation of sets of structuring elements, evaluating that performance, and creating a new generation of sets of structuring elements from among the ets of structuring elements in the preceding generation.

Figure 3B:
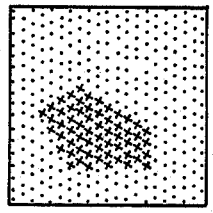
Figure 3C:
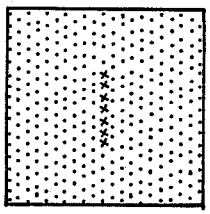
Figure 5A:
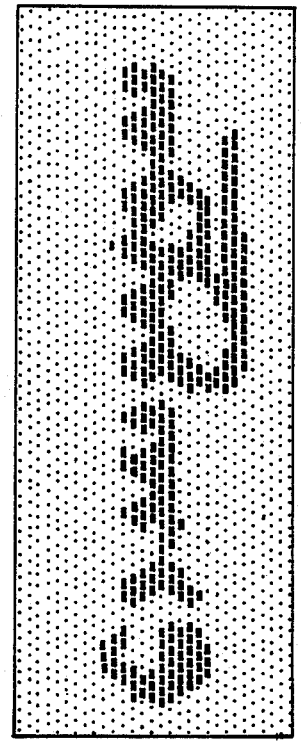
FIGS. 5A-E show the structuring elements and the program form of FIG. 3 as applied to an image sample from Zend script.
Figure 4A:
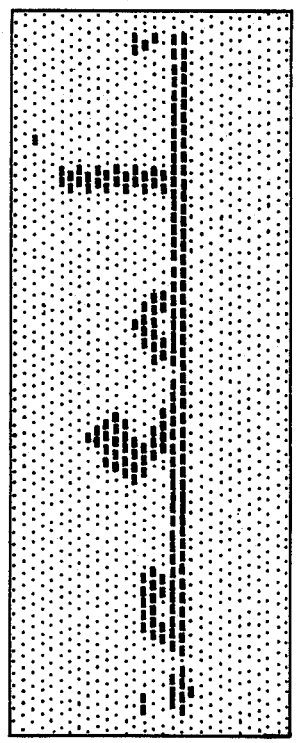
FIGS. 4A-E show the structuring elements and the program form of FIG. 3 as applied to a sample of Aramaic script.

To illustrate the operation of the feature detector of FIG. 3, refer to the script samples shown in FIGS. 4a and 5a. FIG. 4a is an image sample taken from a set of binary training images known to contain text written in Aramaic script, while FIG. 5a is an image sample taken from a set of binary training images known to contain text written in Zend script. Those pixels having a "1" value are designated by a small rectangle, while pixels whose value is "0" are designated by a dot. This two class discrimination problem will be solved by a feature detector which is able to detect samples of Aramaic script, but not able to detect samples of Zend script.

Figure 4B:
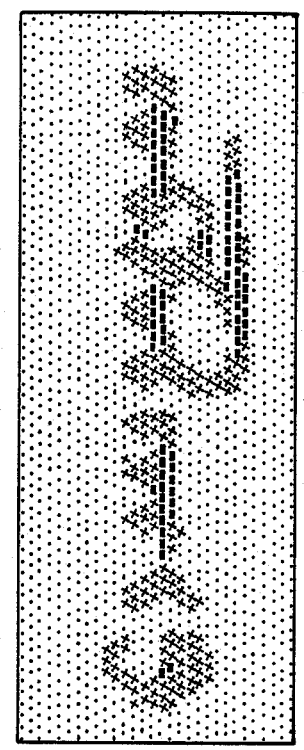
Figure 5B:
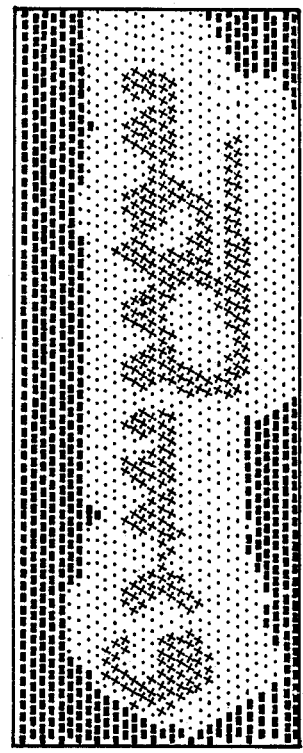

The program form of this feature detector, (I ⊖S1)∩((~I⊖S2)⊕S3), is decomposed into three morphological transformations, followed by a logical operation. The first step, performing the morphological transformation (I⊖S1), is simply an erosion of an image I by structuring element S1, shown in FIG. 3a. FIG. 4b shows the result of eroding the image sample of FIG. 4a by structuring element S1, while FIG. 5b shows the result of applying the same erosion step to the sample in FIG. 5a. Pixel locations which contained a 1 in the preceding image, but which now contain a 0 are designated by a small "x." It can readily be appreciated that erosion by a straight line segment tends to result in images only in those areas where the original image had long horizontal features.

Figure 4C:
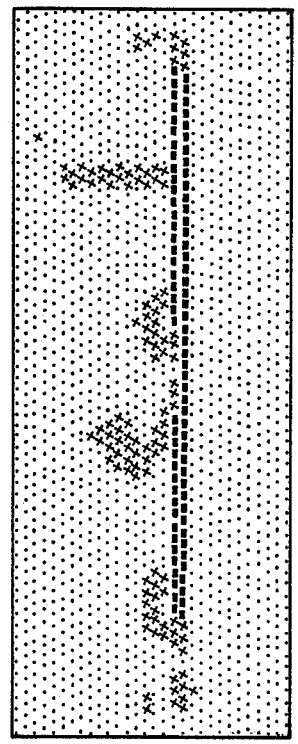
Figure 5C:
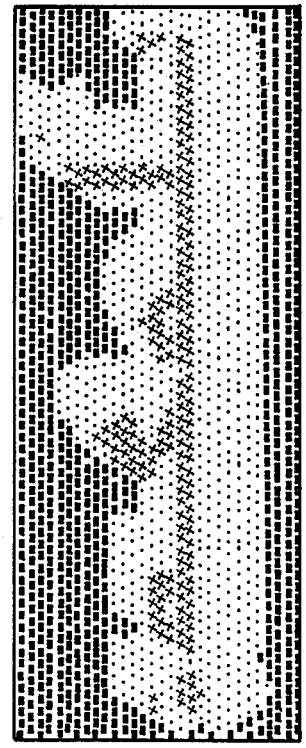
Figure 4D:
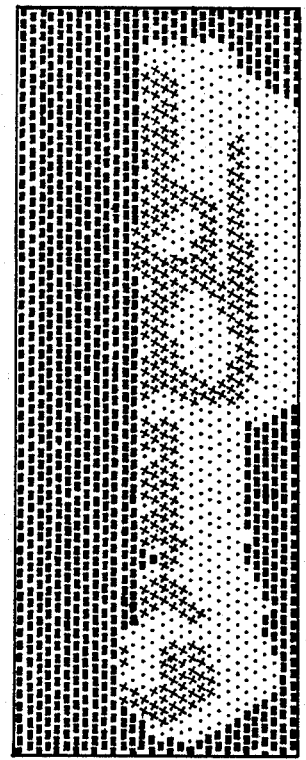
Figure 5D:
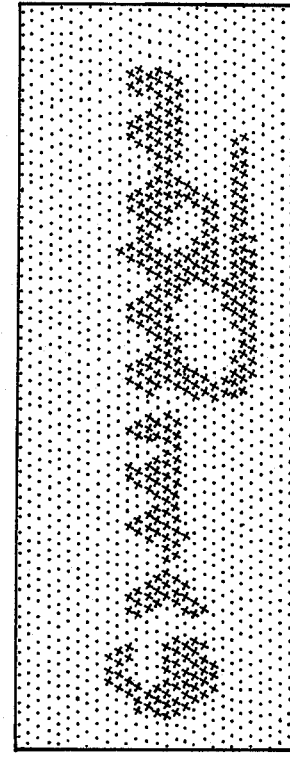
Figure 4E:
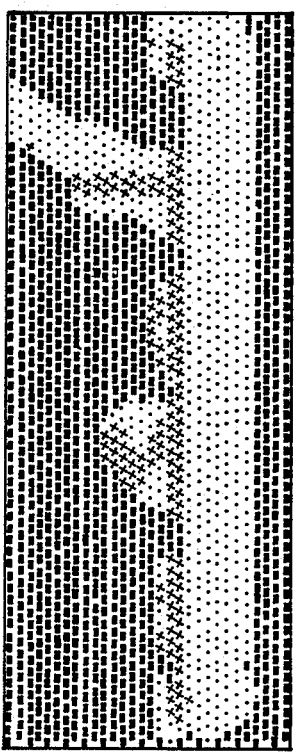
Figure 5E:
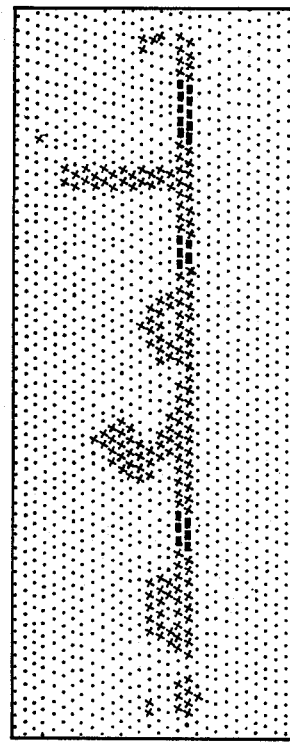

The next step in performing the feature detector in accordance with the program form is to perform the step (~I⊖S2), which erodes the complement of the image I (~I) with the structuring element S2 shown in FIG. 3b. The results from the images shown in FIGS. 4a and 5a are shown in FIGS. 4c and 5c, respectively. In the third morphological transformation steps, the images resulting from the second step are dilated according to structuring element S3 shown in FIG. 3c. The results of this dilation step are shown in FIGS. 4d and 5d, respectively. The logical operation required to complete the program form of the feature detector is to perform the intersection between the resulting images of FIGS. 4b and 4d and the resulting images of FIGS. 5b and 5d. These results are shown respectively in FIGS. 4e and 5e, wherein it is noted that only FIG. 4e is non-empty. In other words, performing the feature detector indicated by the program form and structuring elements of FIG. 3 generates a non-empty resultant image when applied to an image sample from Aramaic script, while it generates an empty image when applied to samples from Zend script. Therefore, the feature detector can discriminate Aramaic script from Zend script.

While one skilled in the art will now appreciate the manner in which feature detectors, as specified by program forms and structuring elements, can be used to discriminate images falling in one class from images not falling in that class, the evolutionary process leading to the structuring elements used in the feature detector will be described.

Given a program form, such as that shown in FIG. 3, a prospective plurality of sets of structuring elements, such as S1, S2 and S3, to be tried with the given program form must be coded as a string of binary numbers. It should be understood that the program form of a particular feature detector may require one or more structuring elements. All of the structuring elements required by a particular feature detector must be coded as a single binary code word. Thus each such binary code word represents a set of structuring elements to be employed together in one application of the feature detector. A differing predetermined subset of the binary code word corresponds to each structuring element of the set of structuring elements. It should be understood that the representation technique for different structuring elements could differ so long as each structuring element is uniquely represented by its predetermined subset of the binary code word.

Figure 9A:
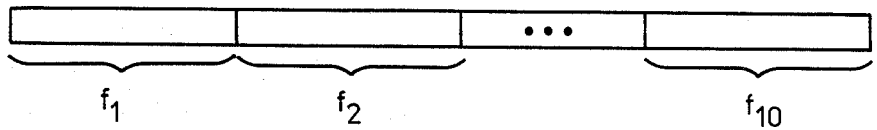
FIGS. 9A-C show some example schemes for encoding structuring elements in bit strings.

Illustrative examples of these representations are shown in FIG. 9. First, the representation of a structuring element created by sequentially dilating ten elemental SEs is shown in FIG. 9a. The binary representation is a concatenation of ten binary strings, each string comprising six binary digits, and being coded to represent a distinct one of the possible elemental SEs shown in accordance with Table 1. Note that the elemental SEs listed in Table 1 include all the elemental SEs which include the origin.

Figure 9B:
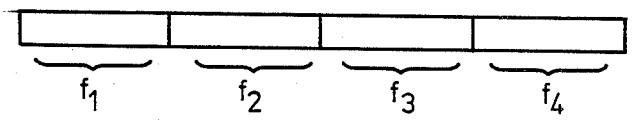

The next representation, showing the dilation of a first repeatedly dilated elemental structuring element by a second repeatedly dilated structuring element (the two repetition factors being designated separately) is shown in FIG. 9b. In this case, the structuring element is represented by four binary strings, each comprising four bits. The first two binary strings represent the two elemental structuring elements, while the second two binary strings represent their respective repetition factors. The coding between binary strings and elemental structuring elements and repetition factors is shown in Table 2. Note that the repetition factor is encoded in a gray code in which consecutive numbers differ in only a single bit.

Figure 9C:
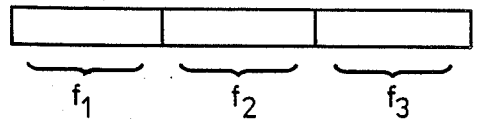

FIG. 9c shows yet another binary representation of a structuring element. In this case, the structuring element is produced by dilating a repeated first elemental structuring element by a repeated second elemental structuring element. The binary string is made from three strings each containing four bits. The first and last strings of four bits represent the repetition factors to be applied to the elemental structuring elements. As in the second case, the repetition factor is encoded in a gray code. The midole four bits of the binary string are coded to represent two possibly distinct elemental structuring elements. For example, as shown in Table 3, if the central four bits of binary string were 0010, the first elemental structuring element is E020 while the second elemental structuring element is E040.

Since each set of structuring elements (such as those to be used with the program form of FIG. 3) can be represented by a binary string, evolutionary steps proceeding from one generation of structuring elements to a next generation of structuring elements can be performed on the population of representative binary strings. Because of the parallels between the evolutionary process of developing sets of structuring elements and the genetic basis for the theory of the origin of species, each of the binary strings is referred to as a chromosome. The chromosomes can then be evolved in accordance with the genetic algorithm presented by John Holland in his book "Adaptation in Natural and Artificial Systems," University of Michigan Press, Ann Arbor, Mich., 1975.

The Genetic Algorith

Figure 7:
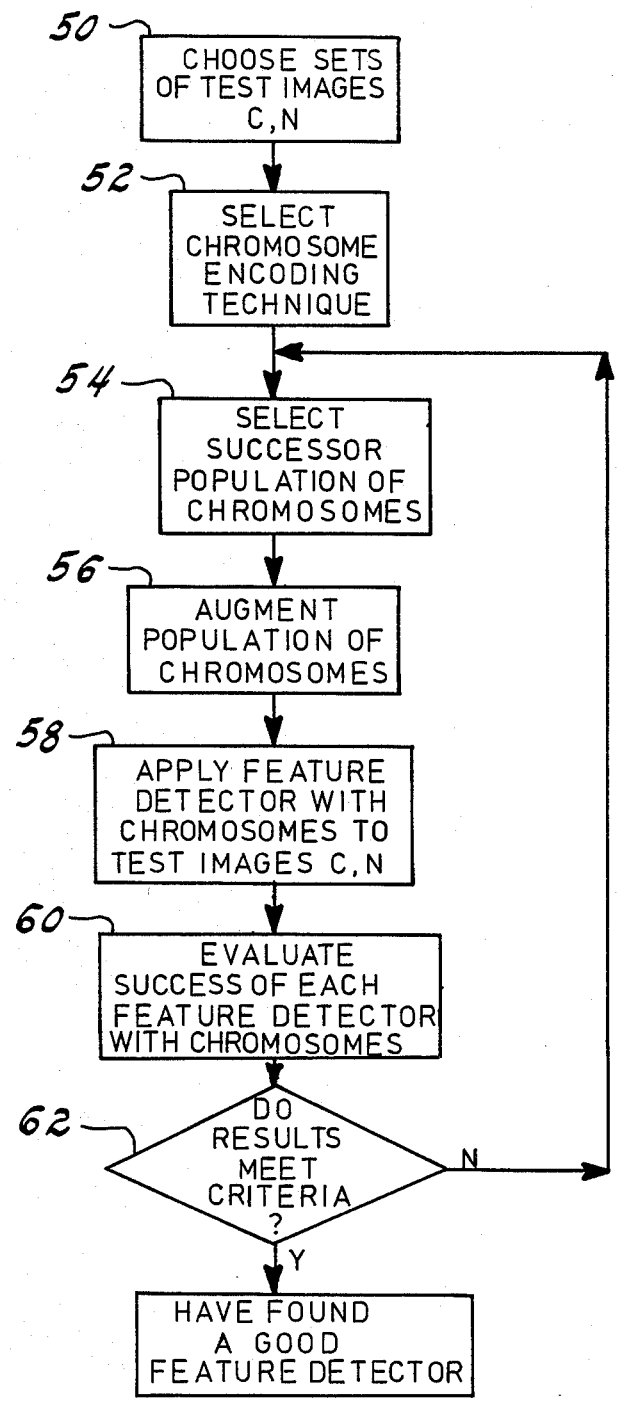
FIG. 7 is a flow chart showing the method of the invention.

The technique of the genetic algorithm, as applied to the development of structuring elements is represented by the flow chart of FIG. 7. As shown in the flow chart, the first step in developing a feature detector, given that a program form has been chosen, is to choose sets of test images, step 50. These test images must include images known to contain features in the classes of features to be disrriminated and images known not to contain the features which define the classes to be discriminated. These sets are referred to, respectively, as A and B.

The next step in the process, step 52, is to select the chromosome encoding technique for the structuring elements to be used with the given program form. Given the program form, the chromosome encoding technique is the manner in which each structuring element of the set of structuring elements is encoded as a predetermined part of the chromosome. The success of the genetic technique for generating sets of structuring elements for use in the feature detector is determined in large part by the appropriateness of the encoding technique for each structuring element of the set. It is important that mutations and crosslinking of chromosomes be capable of providing appropriate variations in the structuring elements. For each structuring element used in the feature detector there will be an appropriate range of variations of type that will be most effective in the discrimination desired by the feature detector. The proper selection of the encoding technique will result in the production of additional examples of structuring elements within the appropriate range of variations of type for each structuring element of the set of structuring elements under the mutation and cross linking process to be described below. This selection of encoding technique must ordinarily be done by a person having some knowledge of the discrimination problem and the program form employed in the feature detector.

The next step, step 54, is the selection of a successor population of chromosomes. Initially, these chromosomes can be generated randomly or, perhaps, as guesses made by a human who understands the classification problem at hand. A population P containing a predetermined number of chromosome representations of structuring elements is produced at this step. In selecting the initial population of chromosomes the number of chromosomes should be directly proportional to the number of bits in each chromosome. Preferably the number of chromosomes is approximately $$M = 1.65 \times 2^{0.21L}$$

where: M is the number of chromosomes and L is the length of each chromosome in bits. This formula is proposed by David E. Goldberg in "Optimal Initial Population Size for Binary-Coded Genetic Algorithms," Clearinghouse for Genetic Algorithms, Department of Engineering Mechanics, University of Alabama, Nov. 1985. The formula is believed valid for chromosome lengths up to at least 60 bits. In the case of later generations of the population of chromosomes, the successor population is selected in relation to the measure of success calculated below. This set of successor chromosomes is randomly selected from the preceeding population, with the probability of selection of each chromosome proportional to the measure of success. This selection technique provides some probability of selection for each chromosome, even those chromosomes with the worst measure of success.

The above described selection technique is believed advantageous over the selection of only those chromosomes having the best measure of success. The above selection technique serves to preserve chromosome diversity and provide a broader search of possible chromosomes than mere selection of the chromosomes with the best measure of success. Selecting only those chromosomes having the best measure of success causes the search for appropriate chromosomes to be too narrowly focused too early. This narrow focus would prevent recovery from a dead end caused by a local maximum in the measure of success function to find the true maximum in the measure of success function. The preferred selection technique preserves some diversity in the chromosomes which would permit recovery from such a local maximum. This can be seen as advantageous by analogy to a maze following program which permits backing up as opposed to a maze following program which does not permit backing up.

The next step in the process, shown in step 56 of FIG. 7, is to augment the population through steps of randomly mutating and/or cross-linking to be described fully later in this description. The number of chromosomes added in the augmented population is preferrably about 30% of the selected successor chromosomes.

Thus from a total population of 130 chromosomes, 100 chromosomes would be selected as successors and an additional 30 chromosomes would be added during the augmenting process. Though this invention can be practiced without such a limitation, it is preferrable for the purposes of program control to keep fixed the number of chromosomes in the population from generation to generation as well as the proportion of the successor chromosomes to augmented chromosomes.

The next step in the process is to apply the feature detectors represented by each of the chromosomes in the augmented population to the images which are members of the sets A and B. This is accomplished in step 58 of the flow chart in FIG. 7, and results in images which are either empty or non-empty.

If the image which results from applying a particular feature detector to a particular image in the training set is an empty image, the response is designated by a binary zero. If, on the other hand, the resulting image is non-empty, the response is designated by a binary one. A feature detector which produces a binary one when presented with images known to contain a given feature and a binary zero when presented with images known not to contain the feature, can be said to be discriminating that feature. A feature detector which generates binary zeros when presented with images known to contain the feature and binary ones when presented with images known not to contain the feature can equally well be said to be discriminating the feature.

Generally, a feature detector will not obtain one response (e.g., a one) for all images known to contain a feature and the other response (e.g., a zero) for all images known not to contain the feature. Therefore, to evaluate the success of each feature detector representated by a chromosome, a formula for scoring each chromosome is necessary. In a two-class problem, such as the script discrimination problem shown in FIGS. 3-5, the number of images correctly determined by the feature detector to have the feature, A, defining the first class is N(F,A,1), while the number of images in the training set correctly decided by the feature detector to contain the other feature, B, is N(F,B,0).

The score given to feature detector F is $$\alpha[N(F,A,b\ 1)+N(F,B,0)]$$

where $\alpha$ is a constant greater than 1. Typically, can have a value of 1.1. In a multi- class discrimination problem, another method of determining the score for each featured detector is used. Ihis formula will be given in greater detail in a succeeding portion of this description.

Based on the score given to each of the chromosomes, the chromosomes are evaluated, to obtain a measure of success for each chromosome indicating which are most suitable for solving the discrimination problem at hand. This step is shown in step 60 of FIG. 7.

As shown in decision block 62, the scores of the best-performing chromosomes are compared to predetermined criteria regarding acceptable rates of correct classification and misclassification. If the resul ts for none of the chromosomes meet the predetermined criteria, the algorithm is performed again, starting at step 54, where the successor population of chromosomes is selected. This process can be repeated for numerous generations.

If, on the other hand, one or more chromosomes are determined to perform the discrimination adequately, the best-performing chromosome is retained for use in the feature detector.

FIG. 6 of the drawings schematically illustrates the random processes of mutation and cross-linking used in step 56 of the flow chart of FIG. 7. In the mutation process shown in FIG. 6a, a first chromosome X, shown as a binary string, is subjected to random changes of the individual binary digits which make up its components. These changes are made according to a probability distribution, with the probability that any one particular component of a given chromosome will be changed being a small fraction of 1. In the example shown in FIG. 6a, chromosome X is transformed, by mutation, to chromosome M, where two of the bits of the chromosome have changed their binary values.

FIG. 6b schematically shows the process of cross-linking of two chromosomes. In the example, chromosomes X and Y, randomly selected from the population of successor chromosomes selected in step 54 of FIG. 7 are separated into prefix and suffix portions at the same point, point 64, in their length. Chromosome X and Y are randomly chosen according to a uniform probability distribution with replacement, so that a particular chromosome can be a parent more than once. Cutting chromosome X results in prefix $P_X$ and the suffix $S_X$ and cutting chromosome Y generates prefix $P_Y$ and suffix $S_Y$. The cross-linking step occurs when the prefix of one chromosome, say, $P_X$, is attached to the suffix of the other chromosome, say, $S_Y$, to produce a new cross-linked chromosome L. A second chromosome can be created by combining prefix $P_Y$ with suffix $S_X$.

Multi-Class Discrimination

A multi-class discrimination problem can be posed in terms of classes that are defined according to whether members of a particular class have, or do not have, certain features. As a simple example, given two features A and B, a three class discrimination problem can be defined in which (1) a first class contains only feature A alone or only feature B alone, (2) a second class contains both features A and B, and (3) a third class contains neither feature A nor feature B. Thus, the success of a multi-class discrimination cannot be measured simply by the success of discriminating each of the features, but rather by its ability to discriminate the combinations of features that make up the classes to be discriminated. The success of such a multi-class discrimination can be expressed in terms of weighted averages of the success of discriminating the features used to define the classes.

In the case of multi-class discrimination it is always necessary to employ a plurality of feature detectors to make a proper classification. This is in contrast to the two-class case in which discrimination can take place with only a single feature detector with its corresponding set of structuring elements. The plurality of feature detectors are employed with corresponding weighting factors which are formed into a system weighting vector for the system image discrimination. This process will be more fully disclosed below.

Figure 8:
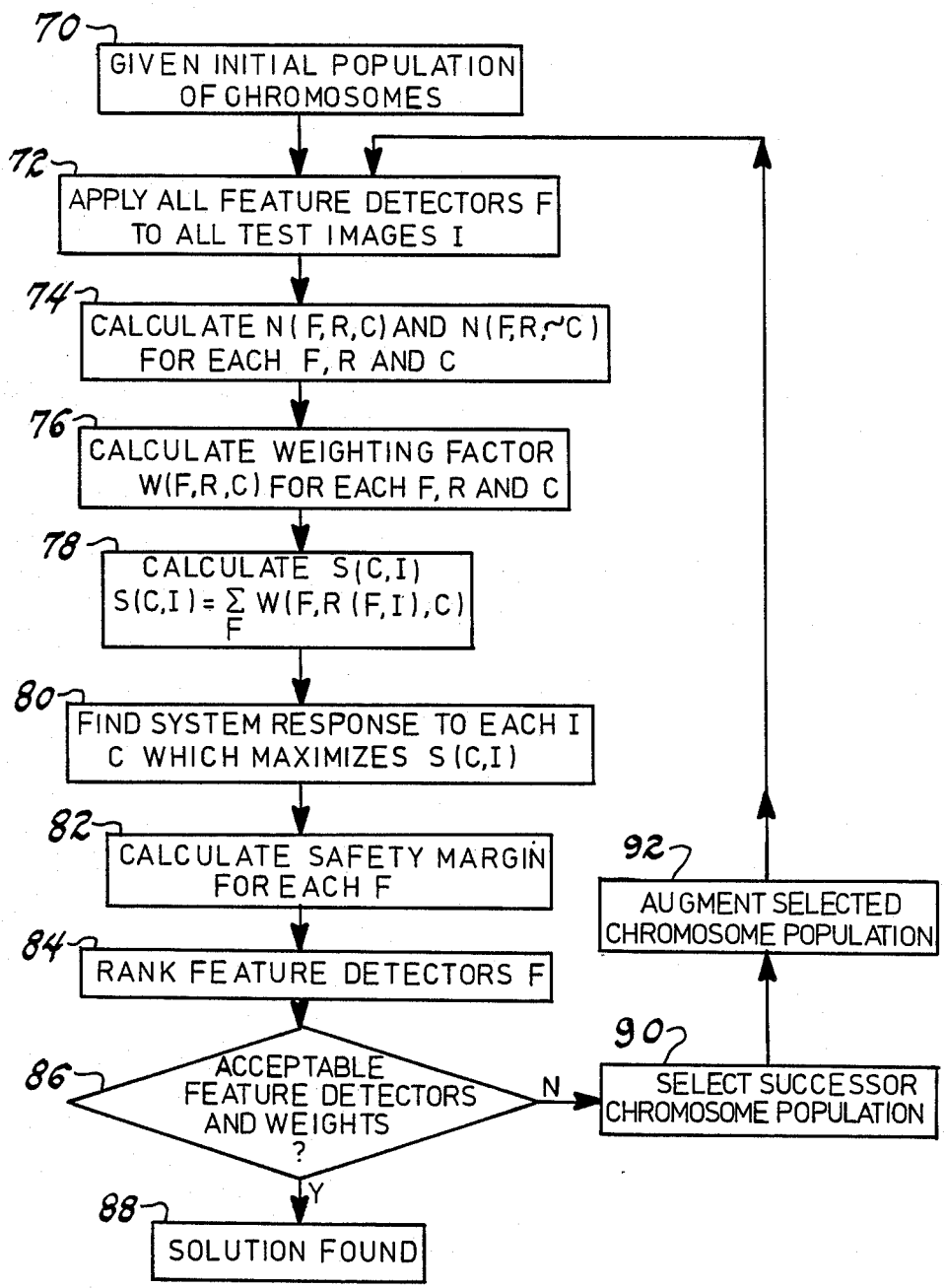
FIG. 8 is a flow chart of the method of the invention applied to multiclass discrimination.

In the case of multi-class discrimination problems, the flowchart of FIG. 8 shows an approach to scoring the discrimination results so as to obtain an acceptable set of feature detectors. At an initial stage, assume that block 70 is presented with an augmented population of chromosomes. Each of these feature detectors, which each comprise the same program form together with one chromosome from the population of chromosomes, is applied to each input image I of a set of training images (step 72). These training images represent each class C of the multi-class discrimination problem. The result of each application of a feature detector F to an input image I is a transformed image. This transformed image may include points or may be empty. Thus the response R of feature detector F to image I (R(F,I)) is either empty or non-empty.

For each feature detector F and class C, the number of training set images receiving a response R when the images in class C are processed according to feature detector F is designated N(F,R,C). The response R can take the binary values zero for empty images and one for non-empty images. Likewise, the number of images not containing the feature in class C but receiving a response R when processed by detector F is designated by N(F,R,~C). These calculations are performed in step 74 of FIG. 9.

In step 76, weighting factor W(F,R,C) is computed from N(F,R,C) and N(F,R,~C) in accordance with the formula $$W(F,R,C) = \frac{N(F,R,C)}{N(F,R,\sim C) + \epsilon} - \frac{N(F,R,\sim C)}{N(F,R,C) + \epsilon}$$

where $\epsilon$ is a parameter called the attenuation factor to prevent division by zero. The attenuation factor preferably has a value in the range between 0.1 and 3.0. This weighting factor W(F,R,C) is calculated for each feature detector F, each of the two results R and each class C. Notice that this weight factor is symmetric with respect to non-empty and empty responses, thus the absence of a feature can be as informative as the presence of the feature.

For each class C and image I in the training set of images, the performance of the overall system of feature detectors F is evaluated by summing together, over all feature detectors F, the components of the weighting factor W corresponding to class C. In this summation process, for each F, the component of W chosen is that which corresponds to the response R which image I produces when it is processed according to feature detector F. In other words, the system response, S(C,I) is provided by the formula $$S(C,I) = \sum_F W(F,R(F,I),C)$$

This step is accomplished in step 78 of FIG. 9.

In step 80 the system response to an input image is determined. For any input image I the system classification response identifies the image I with the class C which maximizes S(C,I). The output of the multi-class discrimination feature detector generation system is the set of chromosomes defining the current set of feature detectors and the weight factors which determine the system response.

For purposes of feature detector evaluation we introduce the concept of a safety margin. For each feature detector F, the safety margin with respect to class C for image I is defined to be

M(F,C,I)=W(F,R(F,I), C(I))−W(F,R(F,I),C)

The safety margin for each particular feature detector F, class C, and image I can be used to define the safety margin of the system as a whole. It is equal to the sum over all F of M(F,C,I); i.e., $$SM(C,I) = \sum_F M(F,C,I)$$

The feature safety margin M(F,C,I) and the system safety margin SM(C,I) can be used to evaluate the performance of a particular feature detector F as shown in step 84 of the flowchart. This evaluation is accomplished in accordance with the formula $$P(F) = \sum_{I,C} \frac{M(F,C,I)}{\max[SM(C,I),K1]}$$

where K1 is a positive constant. As seen from the formula, the score for feature detector F is expressed as a sum of ratios. Each ratio in the sum is the ratio between the margin of the feature detector F for the class C and image I, the system safety margin for class C and image I, as long as that safety margin is greater than the constant K1. If the system safety margin is less than K1, then the denominator is taken to be K1. K1 is set to a small positive value. This prevents inversion of the safety margin component of a feature detector when that feature detector properly discriminates this case, and the system safety margin is negative.

A measure of success score is then assigned to each feature detector and the corresponding chromosome. Decision step 86 is to compare the scores received by the class assignment process to determine whether an acceptably performing set of feature detectors has been found by this procedure. The succeeding plurality of feature detectors will be produced according to a probability distribution based on the success of the preceding plurality of feature detectors and this probability distribution will generally favor feature detectors that are more successful in the preceding generation. If the present population of chromosomes enables an acceptable set of feature vectors, then the process is complete (step 88).

If the present set of chromosomes and weight factors do not form an acceptable set of feature detectors for the multi-class discrimination problem, then step 90 selects a successor set of chromosomes. This successor set of chromosomes is randomly selected with the probability of selecting any particular chromosome proportional to the measure of success determined in step 84. This selected set of chromosomes is then augmented in step 92 by mutation and/or cross linking as previously described. The process is then repeated by return to step 72 with the augmented population of chromosomes.

While the foregoing detailed description has been directed toward one particular embodiment of the invention, many modifications of the method of the invention will be apparent to those skilled in the art. The spirit and scope of the present invention are therefore to be limited only by the following claims.

TABLE 1

| f | E1 (f) |
| --- | --- |
| 000000 | E100 |
| 000001 | E101 |
| 000010 | E102 |
| 000011 | E103 |
| 000100 | E104 |
| 000101 | E105 |
| 000110 | E106 |
| 000111 | E107 |
| 001000 | E110 |

TABLE 1-continued

| f | E1 (f) |
|---|---|
| 001001 | E111 |
| 001010 | E112 |
| 001011 | E113 |
| 001100 | E114 |
| 001101 | F115 |
| 001110 | E116 |
| 001111 | E117 |
| 010000 | E120 |
| 010001 | E121 |
| 010010 | E122 |
| 010011 | E123 |
| 010100 | E124 |
| 010101 | E125 |
| 010110 | E126 |
| 010111 | E127 |
| 011000 | E130 |
| 011001 | E131 |
| 011010 | E132 |
| 011011 | E133 |
| 011100 | E134 |
| 011101 | E135 |
| 011110 | E136 |
| 011111 | E137 |
| 100000 | E140 |
| 100001 | E141 |
| 100010 | E142 |
| 100011 | E143 |
| 100100 | E144 |
| 100101 | E145 |
| 100110 | E146 |
| 100111 | E147 |
| 101001 | E150 |
| 101010 | E151 |
| 101011 | E152 |
| 101100 | E153 |
| 101101 | E154 |
| 101110 | E155 |
| 101111 | E156 |
| 110000 | E157 |
| 110001 | E160 |
| 110010 | E161 |
| 110011 | E162 |
| 110100 | E163 |
| 110101 | E164 |
| 110110 | E165 |
| 110111 | E166 |
| 111000 | E167 |
| 111001 | E170 |
| 111010 | E171 |
| 111010 | E172 |
| 111011 | E173 |
| 111100 | E174 |
| 111101 | E175 |
| 111110 | E176 |
| 111111 | E177 |

TABLE 2

| f | E2 (f) | R2 (f) |
|---|---|---|
| 0000 | E120 | 1 |
| 0001 | E102 | 1 |
| 0011 | E142 | 2 |
| 0010 | E124 | 3 |
| 0110 | E104 | 4 |
| 0111 | E140 | 5 |
| 0101 | E105 | 6 |
| 0100 | E150 | 7 |
| 1100 | E103 | 8 |
| 1101 | E125 | 9 |
| 1111 | E130 | 10 |
| 1110 | E152 | 11 |
| 1010 | E112 | 12 |
| 1011 | E121 | 13 |
| 1001 | E101 | 14 |
| 1000 | E110 | 15 |

TABLE 3

| f | R2 (f) | E3 (f) | E4 (f) |
|---|---|---|---|
| 0000 | 1 | E120 | E020 |
| 0001 | 1 | E020 | E040 |
| 0010 | 3 | E020 | E040 |
| 0011 | 2 | E020 | E040 |
| 0100 | 7 | E001 | E040 |
| 0101 | 6 | E001 | E040 |
| 0110 | 4 | E020 | E040 |
| 0111 | 5 | E040 | E040 |
| 1000 | 15 | E002 | E002 |
| 1001 | 14 | E001 | E002 |
| 1010 | 12 | E001 | E002 |
| 1011 | 13 | E001 | E002 |
| 1100 | 8 | E001 | E040 |
| 1101 | 9 | E001 | E040 |
| 1110 | 11 | E001 | E002 |
| 1111 | 10 | E001 | E001 |

I claim:

1. A method for generating a set of structuring elements for use in an image processing program in a computer, the image processing program being operative to apply feature detectors to an input image comprising an input digital matrix of points having digital values to generate a corresponding transformed digital matrix of points having digital values, each point of said transformed digital matrix having a digital value which is a function of the digital value of a corresponding point in said input digital matrix and/or the digital values of points immediately neighboring said corresponding point in said input digital matrix, the transformed digital matrix containing either no points having nonzero values or at least one point having a nonzero value, each featuare detector consisting of a program form including a predetermined series of morphological operations applied to the input digital matrix and a spatial constant component comprising a set structuring elements, the method comprising the steps of:

(a) selecting a plurality of sets of structuring elements;

(b) representing each set of structuring elements in a single binary code word chromosome in accordance with a predetermined encoding technique, thereby producing a plurality of said chromosomes;

(c) applying a plurality of featuare detectors equal in number to the number of said plurality of chromosomes to a first set of images known to belong to a predetermined class to and a second set of images known not to belong to said predetermined class, each feature detector consisting of said program form and a unique one of said plurality of chromosomes, each feature detector thereby producing a transformed digital matrix containing either no points having nonzero values or at least one point having a nonzero value;

(d) associating a score with each feature detector based upon the number of input images from said first set of input images in which said feature detector produces a transformed digital matrix containing at least one point having a nonzero value and the number of input images from said second set of input images in which said feature detector produces a transformed digital matrix containing no point having a nonzero value;

(e) determining whether the score for any of said plurality of feature detectors meets a predetermined criterion;

(f) if the score of at least one of said plurality of feature detectors meets said predetermined criterion, identifying the set of structuring elements represented by the single binary code word chromosome for one such feature detector having a score meeting said predetermined criterion said identified set of structuring elements being the set of structuring elements generated by the method;

(g) if the score of none of said plurality of feature detectors meets said predetermined criterion (1) producing a succeeding plurality of chromosomes representing a succeeding plurality of sets of structural elements by randomly selecting a subset of said plurality of chromosomes where the probability of selection of any chromosome of said plurality of chromosomes is proportional to the score associated with the feature detector employing that chromosome, and augmenting said subset of chromosomes with chromosomes corresponding to modifications and/or combinations of chromosomes of said subset of chromosomes, (2) repeating said step of applying a plurality of feature detectors to said first set of images known to belong to said predetermined class and to said second set of images known not to belong to said predetermined class employing said succeeding plurality of chromosomes, (3) repeating said step of associating a score with each feature detector, and (4) repeating said step of determining whether the score for any of said plurality of feature detectors meets said predetermined criterion, until the score of at least one of said plurality of feature detectors meets said predetermined criterion.

2. The method of claim I, wherein said step of selecting a plurality of sets of structuring elements consists of randomly selecting a predetermined number of structuring elements.

3. The method of claim 1, wherein said score of a feature detector F, is calculated by the formula $$\alpha \{N(F,A,1) - N(F,B,0)\}$$

where $\alpha$ is a numerical parameter greater than 1, $N(F,A,1)$ is the number of images in the first set of input images for which said feature detector F produces a transformed digital matrix containing at least one point having a non-zero value, and $N(F,B,0)$ is the number of images belonging to the second set of input images for which said featuare detector F produces a transferred digital matrix containing no points having non-zero value.

4. The method of claim 1, wherein:
said succeeding plurality of chromosomes includes a predetermined number of chromosomes.

5. The method of claim 4, wherein:
said subset of chromosomes is approximately three quarters of said plurality of chromosomes.

6. The method of claim 1, wherein:
said subset of chromosomes is augmented by at least one chromosome created from a corresponding chromosome in said subset of chromosomes by random alteration of at least one individual bit of said corresponding chromosome.

7. The method of claim 1, wherein:
said subset of chromosomes is augmented by at least one chromosome created having an initial group of bits identical to the initial group of bits of a first corresponding chromosome of said subset of chromosomes and a final group of bits identical to the final group of bits of a second corresponding chromosome of said subset of chromosomes.

8. The method of claim 1, wherein:
said subset of chromosomes is augmented by at least one augmentation chromosome created having an initial group of bits identical to the initial bits of a first corresponding chromosome of said subset of chromosomes and a final group of bits identical to the final bits of a second corresponding chromosome of said subset of chromosomes, said augmentation chromosome further subject to random alteration of at least one individual bit.

9. The method of claim 1, wherein:
said step of representing each set of structuring elements by a binary code word chromosome includes representing each structuring element of said set of structuring elements by a corresponding predetermined subset of the bits of said binary code word chromosome.

10. The method of claim 9, wherein:
said step of representing each set of structuring elements by a binary code word chromosome includes representing at least one structuring element by N elemental structuring elements, each elemental structuring element represented by an M-bit string, said at least one structuring element formed by sequential dilation of said N elemental structuring elements.

11. The method of claim 10, wherein:
said M-bit strings each include 6 bits and said N elemental structuring elements comprise 64 elemental structuring elements, the 64 elemental structuring elements including an elemental structuring element consisting of an origin point and all possible elemental structuring elements consisting of an origin point and one or more points hexagonally adjacent to the origin point.

12. The method of claim 10, wherein:
N is 10.

13. The method of claim 9, wherein:
said step of representing each set of structuring elements by a binary code word chromosome includes representing at least one structuring element by 4 M-bit strings, the first M-bit string representing a first repetition number, the second M-bit string representing an elemental structuring element, the third M-bit string representing a second repetition number and the fourth M-bit string representing an elemental structuring element, said at least one structuring element formed by dilation of the elemental structuring element represented by said second M-bit string dilated by itself a number of times equal to said first repetition number with the elemental structuring element represented by said fourth M-bit string dilated by itself a number of times equal to said second repetition number.

14. The method of claim 13, wherein:
said M-bit strings each include 4 bits and said first M-bit string representing said first repetition number and said third M-bit string representing said second repetition number are each in the range between 1 and 15 inclusive in accordance with a gray code in which the M-bit strings representing consecutive numbers differ in only a single bit.

15. The method claimed in claim 13 wherein:
said M-bit strings each include 4 bits and said second M-bit string and said fourth M-bit string represents elemental structuring elements by the same encoding technique, said encoding technique enabling said second M-bit string and said fourth M-bit string to represent all possible elemental structuring elements consisting of an origin point and one point hexagonally adjaacent to the origin point and a subset of all possible elemental structural elements consisting of an origin point and two or more points hexagonally adjacent to the origin point.

16. The method of claim 9, wherein:
said step of representing each set of structuring element by a binary code word chromosome includes representing at least one structuring element by 3 M-bit strings, the first M-bit string representing a first repetition number, the second M-bit string representing a first elemental structuring element according to a first encoding and a second elemental structuring element according to a second encoding and the third M-bit string representing a second repetition number, said structuring element formed by dilation of said first elemental structuring element representing a second repetition number, said structuring element formed by dilation of said first elemental structuring element represented by the second M-bit string in accordance with said first encoding dilated by itself a number of times equal to said first repetition number with said second elemental structuring element represented by said second M-bit string in accordance with said second encoding dilated by itself a number of times equal to said second repetition number.

17. The method of claim 16, wherein:
said M-bit strings each include 4 bits and said first M-bit string representing said first repetition number and said third M-bit string rerresenting said second repetition number are each in range between 1 and 15 inclusive in accordance with a gray code in which the M-bit strings representing consecutive numbers differ in only a single bit.

18. The method claimed in claim 16 wherein:
said M-bit strings each include 4 bits and said first encoding technique enabling said second M-bit string to represent all possible elemental structuring elements consisting of one point hexagonally adjacent to an origin point and said second encoding technique enabling said second M-bit string to represent all possible elemental structuring elements consisting of one point hexagonally adjacent to an origin point.

19. The method of claim 9, wherein:
each set of structuring elements includes a plurality of structuring elements; and
a first predetermined subset of bits of said single binary code word chromosome representing a first structuring element of said plurality of structuring elements represents its corresponding structuring element in an encoding techniue which differs from the encoding technique by which at least one other predetermined subset of bits of said single binary code word chromosome represents its corresponding structuring element.

20. A method for generating a plurality of sets of structuring elements for use in an image processing program in a computer, the image processing program being operative to apply feature detectors to an input image comprising an input digital matrix of points having digital values to generate a corresponding transformed digital matrix of points having digital values, each point of said transformed digital matrix having a digital value which is a function of the digital value of a corresponding point in said input digital matrix and/or the digital values of points immediately neighboring said corresponding point in said input digital matrix, the transformed digital matrix containing either no points having nonzero values or at least one point having a nonzero value, each feature detector consisting of a program form including a predetermined series of morphological operations applied to the input digital matrix and a spatial constant component comprising a set structuring elements, the method comprising the steps of:

(a) selecting a plurality of sets of structuring elements;

(b) representing each set of structuring elements in a single binary code word chromosome in accordance with a predetermined encoding technique, thereby producing a plurality of said chromosomes;

(c) applying a plurality of feature detectors equal in number to the number of said plurality of chromosomes to a set of training images, each training image known to belong to one class of a predetermined set of classes, each feature detector consisting of said program form and a unique one of said plurality of chromosomes, each feature detector having a response of either a first type by producing a transformed digital matrix containing no points having nonzero values or of a second type by producing at least one point having a nonzero value;

(d) computing a weighting factor for each feature detector for each class of said predetermined set of classes for each of said first type and said second type response, the weighting factor for a particular feature detector for a particular class for a particular response type based upon the number of training images belonging to said class for which said feature detector produces a response of the particular response type and the number of training images not belonging to said class for which said feature detector produces a response of the particular response type;

(e) computing a system response vector having a component for each class of said predetermined set of classes for each training image of said set of training images, the component for a particular class for a particular training image based upon the summation over all feature detectors of the weighting factors for each feature detector for the response type which the feature detector produces for the particular training image for the particular class;

(f) associating a score with each feature detector for each class, the score for each particular class based upon the capability of said feature detector to produce a response of one of said first and second types for training images belonging to the particular class and a response of the other of said first and second types for training images not belonging to the particular class;

(g) determining whether there exists a set of feature detectors having scores for each class which meets a predetermined criterion;

(h) if there exists a set of feature detectors having scores for each class which meets said predetermined criterion, identifying the set of structuring elements represented by the single binary code word chromosome for each feature detector of said set of feature detectors, said identified sets of structuring elements being the sets of structuring elements generated by the method;

(i) if there does not exist a set of feature detectors having scores for each class which meets said predetermined criterion, (1) producing a succeeding plurality of chromosomes repre se nting a succeeding plurality of sets of structural elements by randomly selecting a subset of said plurality of chromosomes where the probability of selection of any chromosome of said plurality of chromosomes is proportional to the score associated with the feature detector employing that chromosome, and augmenting said subset of chromosomes with chromosomes corresponding to modifications and/or combinations' of chromosomes of said subset of chromosomes, (2) repeating said step of applying a plurality of feature detectors to said set of training images, (3) repeating said step of computing a weighting factor for each feature detector for each class of said predetermined set of classes for each of said first type and said second type response, (4) repeating said step of computing a system response vector having a component for each class of said predetermined set of classes for each training image of said set of training images, (5) repeating said step of associating a score with each feature detector for each class, and until there exists a set of feature detectors having scores for each class which meets said predetermined criterion.

21. The method of claim 20, wherein:
said step of representing each set of structuring elements by a binary code word chromosome includes representing each structuring element of said set of structuring elements by a corresponding predetermined subset of the bits of said binary code word chromosome.

22. The method of claim 21, wherein:
said step of representing each set of structuring elements by a binary code word chromosome includes representing at least one structuring element by N elemental structuring elements, each elemental structuring element represented by an M-bit string, said at least one structuring element formed by sequential dilation of said N elemental structuring elements.

23. The method of claim 22, wherein:
said M-bit strings each include 6 bits and said N elemental structuring elements comprise 64 elemental structuring elements, the 64 elemental structuring elements including an elemental structuring element consisting of an origin point and all possible elemental structuring elements consisting of an origin point and one or more points hexagonally adjacent to the origin point.

24. The method of claim 22, wherein:
N is 10.

25. The method of claim 21 wherein:
said step of representing each set of structuring elements by a binary code word chromosome includes representing at least one structuring element by 4 M-bit strings, the first M-bit string representing a first repetition number, the second M-bit string representing an elemental structuring element, the third M-bit string representing a second repetition number and the fourth M-bit string representing an elemental structuring element, said at least one structuring element formed by dilation of the elemental structuring element represented by said second M-bit string dilated by itself a number of times equal to said first repetition number with the elemental structuring element represented by said fourth M-bit string dilated by itself a number of times equal to said second repetition number.

26. The method of claim 25, wherein:
said M-bit strings each include 4 bits and said first M-bit string representing said first repetition number and said third M-bit string representing said second repetition number are each in the range between 1 and 15 inclusive in accordance with a gray code in which the M-bit strings representing consecutive numbers differ in only a single bit.

27. The method claimed in claim 25 wherein:
said M-bit strings each include 4 bits and said second M-bit string and said fourth M-bit string represents elemental structuring elements by the same encoding technique, said encoding technique enabling said second M-bit string and said fourth M-bit string to represent all possible elemental structuring elements consisting of an origin point and one point hexagonally adjacent to the origin point and a subset of all possible elemental structural elements consisting of an origin point and two or more points hexagonally adjacent to the origin point.

28. The method of claim 21, wherein:
said step of representing each set of structuring element by a binary code word chromosome includes representing at least one structuring element by 3 M-bit strings, the first M-bit string representing a first repetition number, the second M-bit string representing a first elemental structuring element according to a first encoding and a second elemental structuring element according to a second encoding and the third M-bit string representing a second repetition number, said structuring element formed by dilation of said first elemental structuring element represented by the second M-bit string in accordance with said first encoding dilated by itself a number of times equal to said first repetition number with said second elemental string represented by said second M-bit string in accordance with said second encoding dilated by itself a number of times equal to said second repetition number.

29. The method of claim 28, wherein:
said M-bit strings each include 4 bits and said first M-bit string representing said first repetition number and said third M-bit string representing said second repetition number are each in range between 1 and 15 inclusive in accordance with a gray code in which the M-bit strings representing consecutive numbers differ in only a single bit.

30. The method of claim 21, wherein:
each set of structuring elements includes a plurality of structuring elements; and
a first predetermined subset of bits of said single binary word chromosome representing a first structuring element of said plurality of structuring elements represents its corresponding structuring element in an encoding technique which differs from the encoding technique by which at least one other predetermined subset of bits of said single binary word chromosome represents its corresponding structuring element.

31. The method of claim 20, wherein:
said succeeding plurality of chromosomes includes a predetermined number of chromosomes.

32. The method of claim 31, wherein:
said subset of of chromosomes is approximately three quarters of said plurality of chromosomes.

33. The method of claim 20, wherein:
said subset of chromosomes is augmented by at least one chromosome created from a corresponding chromosome in said subset of chromosomes by random alteration of at least one individual bit of said corresponding chromosome.

34. The method of claim 20, wherein:
said subset of chromosomes is augmented by at least one chromosome created having group of bits identical to the initial group of bits of a first corresponding chromosome of said subset of chromosomes and a final group of bits identical to the final group of bits of a second corresponding chromosome of said subset of chromosomes.

35. The method of claim 20, wherein:
said subset of chromosomes is augmented by at least one augmentation chromosome created having an initial group of bits identical to the initial group of bits corresponding chromosome of said subset of chromosomes and a final group of bits identical to the final group of bits of a second corresponding chromosome of said subset of chromosomes, said augmentation chromosome further subject to random alteration of at least one individual bit.

36. The method of claim 20, wherein;
the weighting factor for the feature detector F, the response type R and the class C is computed according to the formula:

$$W(F,R,C) = \frac{N(F,R,C)}{N(F,R,\sim C) + \epsilon} - \frac{N(F,R,\sim C)}{N(F,R,C) + \epsilon}$$

where N(F,R,C) is the number of training images of the set of training images within the class C receiving the response type R upon application of feature detector F, N(F,R,~C) is the number of training images of the set of training images not within the class C receiving the response R upon application of feature detector F, and ? is a predetermined constant.

37. The method of claim 36 wherein:
the sytem response vector for each class is computed according to the formula $$S(C,I) = \sum_F W(F,R(F,I),C)$$

where R(F,1) is the response type upon application of feature detector F to training image I.

38. The method of claim 37, further comprising the step of:
determining a system classification response to an image I by selecting the class C as the system classification response which provides the maximum system response vector S(C,I).

39. The method claimed in claim 28 wherein:
said M-bit strings each include 4 bits and said said first encoding technique enabling said second M-bit string to represent all possible elemental structuring elements consisting of one point hexagonally adjacent to an origin point and said second encoding technique enabling said second M-bit string to represent all possible elemental structuring elements consisting of one point hexagonally adjacent to an origin point.

40. The method of claim 36 wherein:
the step of assorting a score with each feature detector includes
computing a safety margin for each feature detector F with respect to each class C and training image I according to the formula $$M(F,C,I) = W(F,R(F,I), C(I)) - W(F,R(F,I),C)$$

where (R(F,I) is the response type upon application of the feature vector F to the training image I and C(I) is the class of the training image I,
computing a system safety margin with respect to a class C and a training image I according to the formula $$SM(C,I) = \sum_F M(F,C,I)$$

and
computing the feature detector score according to the following formula $$P(F) = \sum_{I,C} \frac{M(F,C,I)}{\max\{SM(C,I),K1\}}$$

where K1 is a positive constant.

41. The method of claim 20, wherein said step of selecting a plurality of sets of structuring elements consists of randomly selecting a predetermined number of structuring elements.

* * * * *

UNITED STATES PATENT AND TRADEMARK OFFICE
CERTIFICATE OF CORRECTION

PATENT NO. : 4,821,333
DATED : April 11, 1989
INVENTOR(S) : Gillies

It is certified that error appears in the above-identified patent and that said Letters Patent is hereby corrected as shown below:

Column 5, line 47, "ets" should be --sets--.

Column 7, line 22, "midole" should be --middle--.

Column 7, line 52, "disrriminated" should be --discriminated--.

Column 9, line 45, "$\alpha[N(F,A,b\ 1) + N(F,B,0)$" should be $[N(F,A,1) + N(F,B,0)]_\alpha$ --.

Column 9, line 50, "Ihis" should be --This--.

Column 9, line 61, "resul ts" should be --results--.

Column 13, line 8, "F115" should be --E115--.

Column 17, line 9, "adjaacent" should be --adjacent--.

Column 17, line 38, "rerresenting" should be --representing--.

Column 19, line 13, "repre se nting" should be --representing--.

Column 21, line 21, "having group" should be --having initial group--.

Column 21, line 32, "bits corresponding" should be --bits of a first corresponding--.

Column 21, line 53, "?" should be --€-- .

UNITED STATES PATENT AND TRADEMARK OFFICE
CERTIFICATE OF CORRECTION

PATENT NO. : 4,821,333

DATED : April 11, 1989

INVENTOR(S) : Gillies

Page 2 of 2

It is certified that error appears in the above-identified patent and that said Letters Patent is hereby corrected as shown below:

Column 22, line 6 "1" should be --I--.

Signed and Sealed this

Thirtieth Day of January, 1990

*Attest:*

JEFFREY M. SAMUELS

*Attesting Officer*     *Acting Commissioner of Patents and Trademarks*